United States Patent [19]

Glatzel

[11] 4,136,931
[45] Jan. 30, 1979

[54] HIGH SPEED WIDE ANGLE LENS SYSTEM

[75] Inventor: Erhard Glatzel, Heidenheim Germany

[73] Assignee: Carl Zeiss Stiftung, Oberkochen, Germany

[21] Appl. No.: 746,655

[22] Filed: Dec. 2, 1976

[30] Foreign Application Priority Data

Dec. 6, 1975 [DE] Fed. Rep. of Germany ....... 2554963

[51] Int. Cl.$^2$ .......................... G02B 3/04; G02B 9/64
[52] U.S. Cl. .................................... 350/189; 350/176; 350/214
[58] Field of Search ........................ 350/176, 214, 189

[56] References Cited

U.S. PATENT DOCUMENTS

| | | | |
|---|---|---|---|
| 3,589,798 | 6/1971 | Ogura | 350/214 X |
| 3,915,558 | 10/1975 | Glatzel | 350/214 |
| 3,999,840 | 12/1976 | Momiyama | 350/214 |
| 4,025,169 | 5/1977 | Fischer et al. | 350/214 X |

*Primary Examiner*—Paul A. Sacher
*Attorney, Agent, or Firm*—Stonebraker, Shepard & Stephens

[57] ABSTRACT

A high speed wide angle lens system of the same general kind disclosed in Glatzel, U.S. Pat. No. 3,915,558, but with a slightly larger aperture and with improved image formation. While the lens formation of the U.S. Pat. No. 3,915,558 starts with two negative components, followed by a positive component, a meniscus, two negative components and two positive components in the rear part, the improved performance of the present invention is achieved by such a modification which enforces the positive power of the rear part of the lens. For this purpose the rear part is made to consist of three positive components (VII, VIII, IX) which are designed in such a way that the quotient of the sum of the surface powers of the air lenses between the three rear positive components $\Sigma\phi_\delta$ divided by the refractive power $(\phi^+_{EO})$ of the air lens between the two positive components of the front part of the lens (III, IV) lies between a disclosed upper and lower limit and that in addition to this rule the paraxial surface power sum of the second-last component (VIII) also is within disclosed limits times the paraxial surface power sum of the third-last component (VII). Eight specific examples are given to illustrate the validity of the disclosed conditions and rules.

10 Claims, 4 Drawing Figures

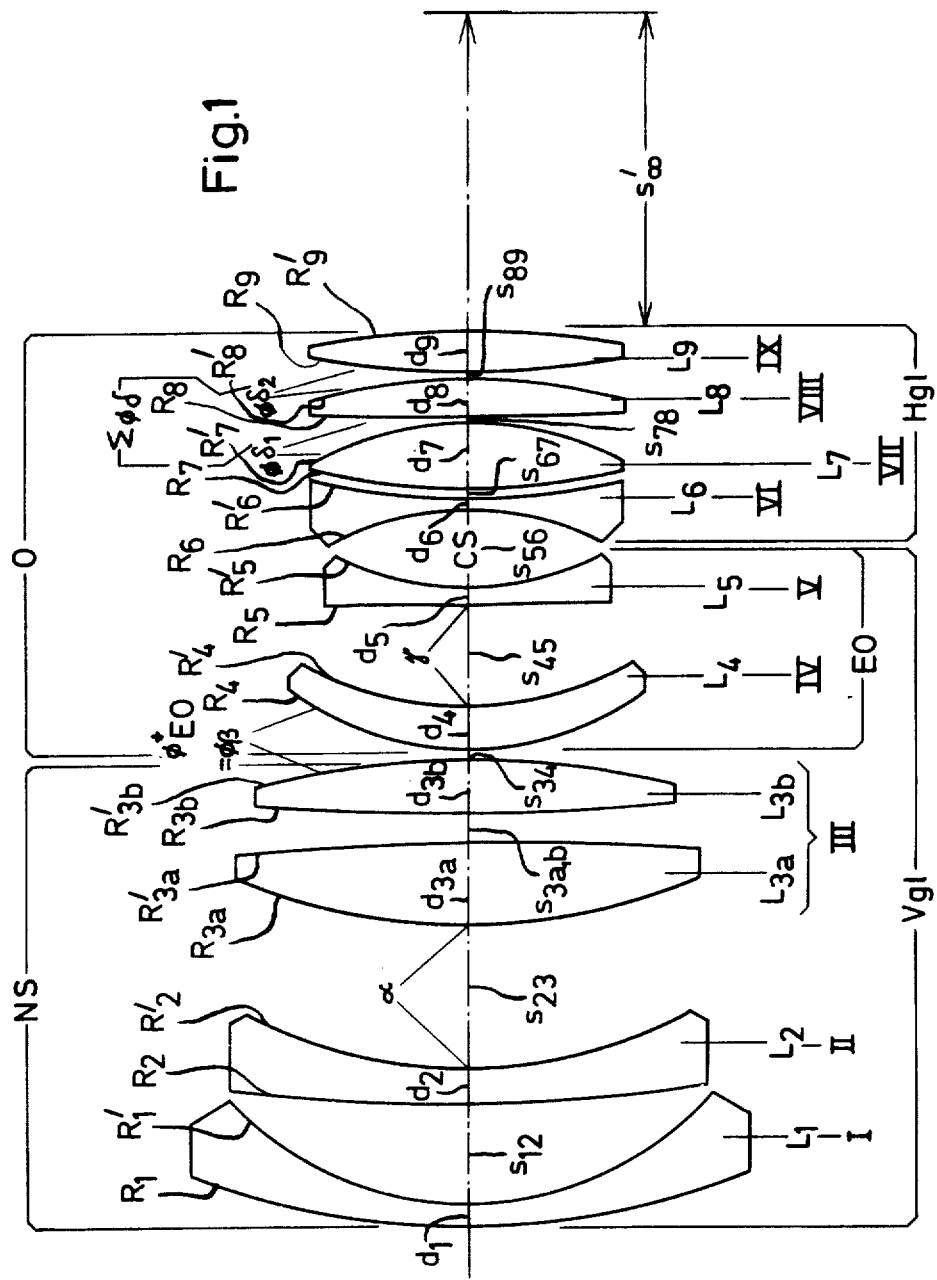

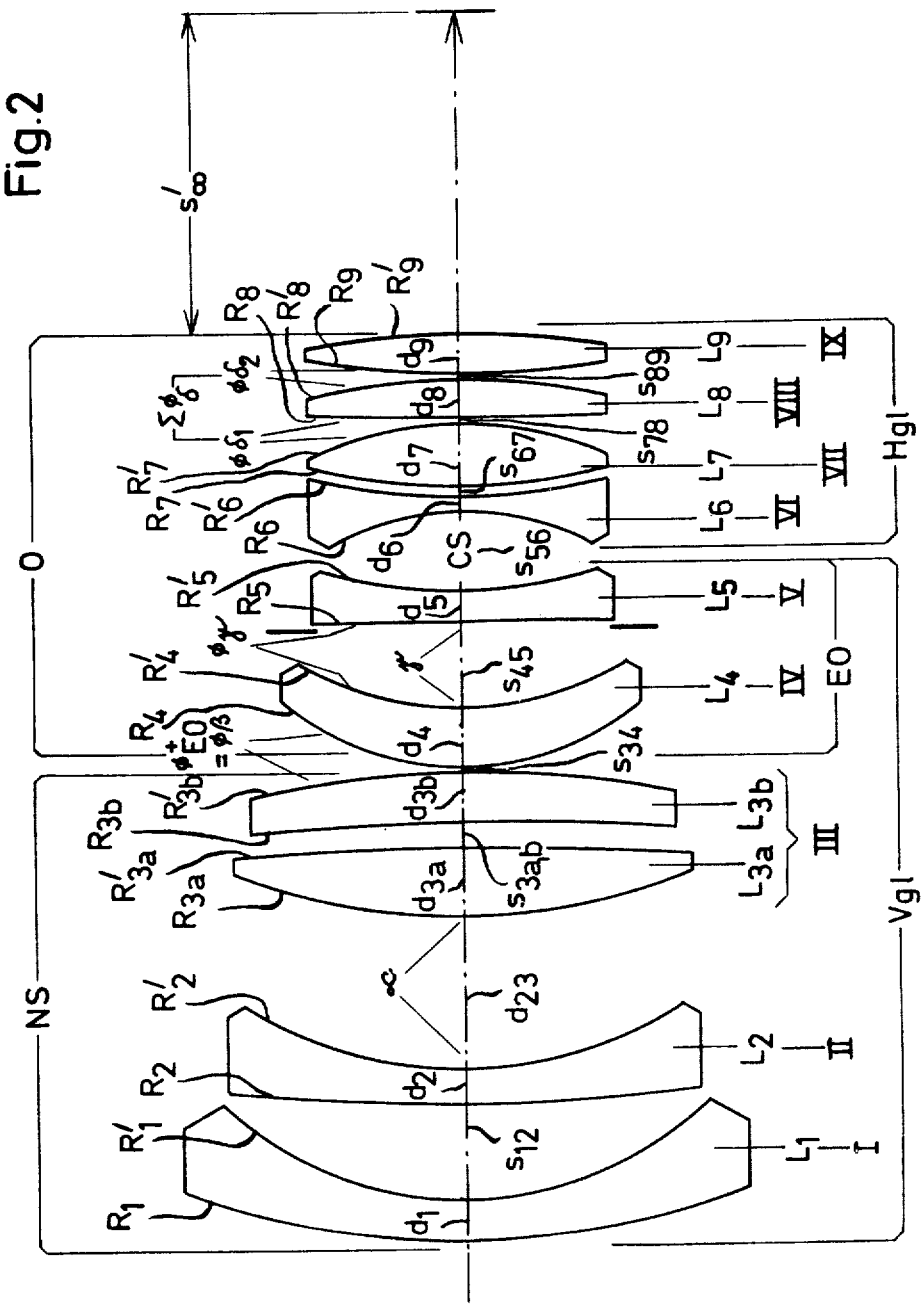

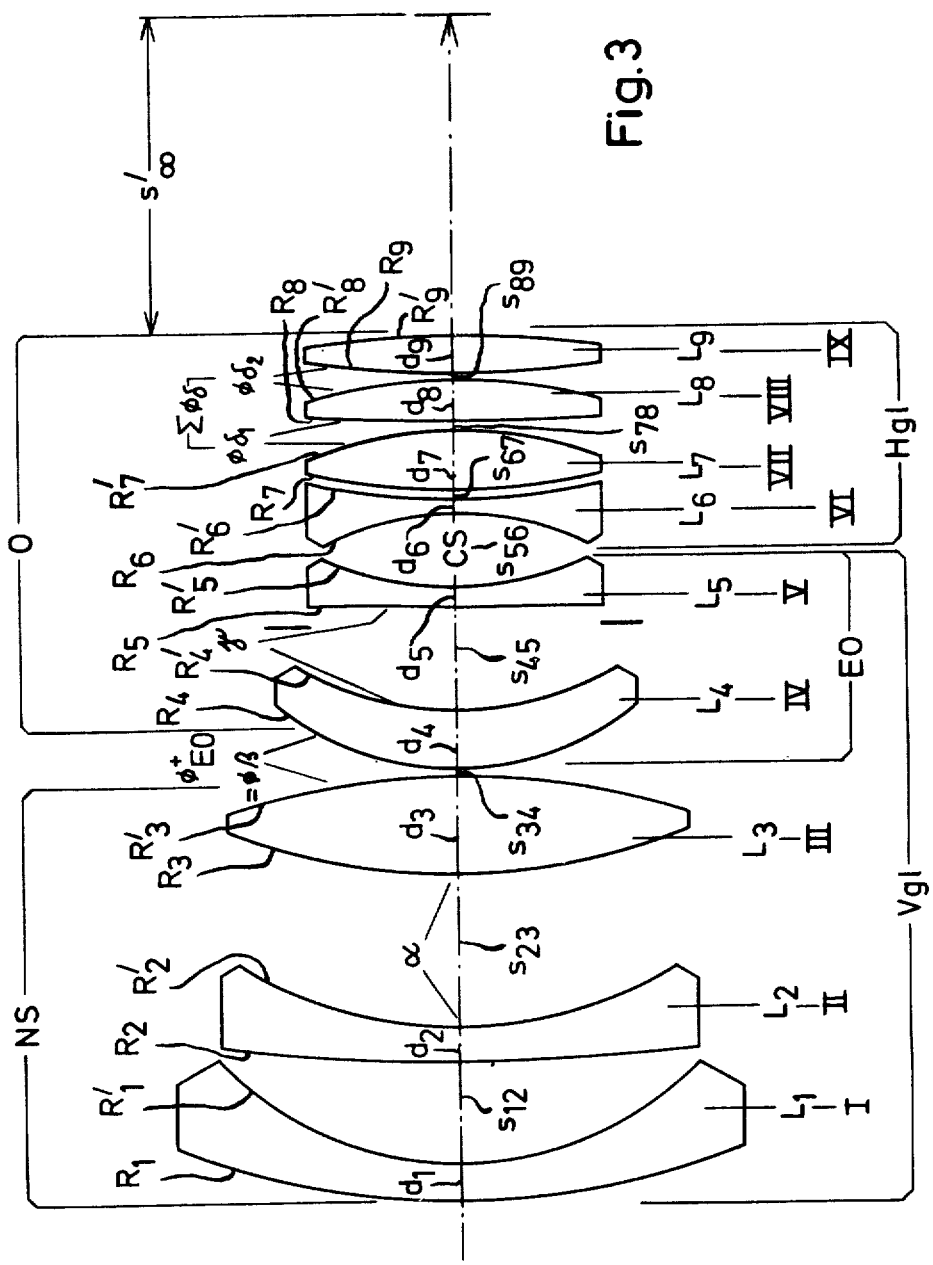

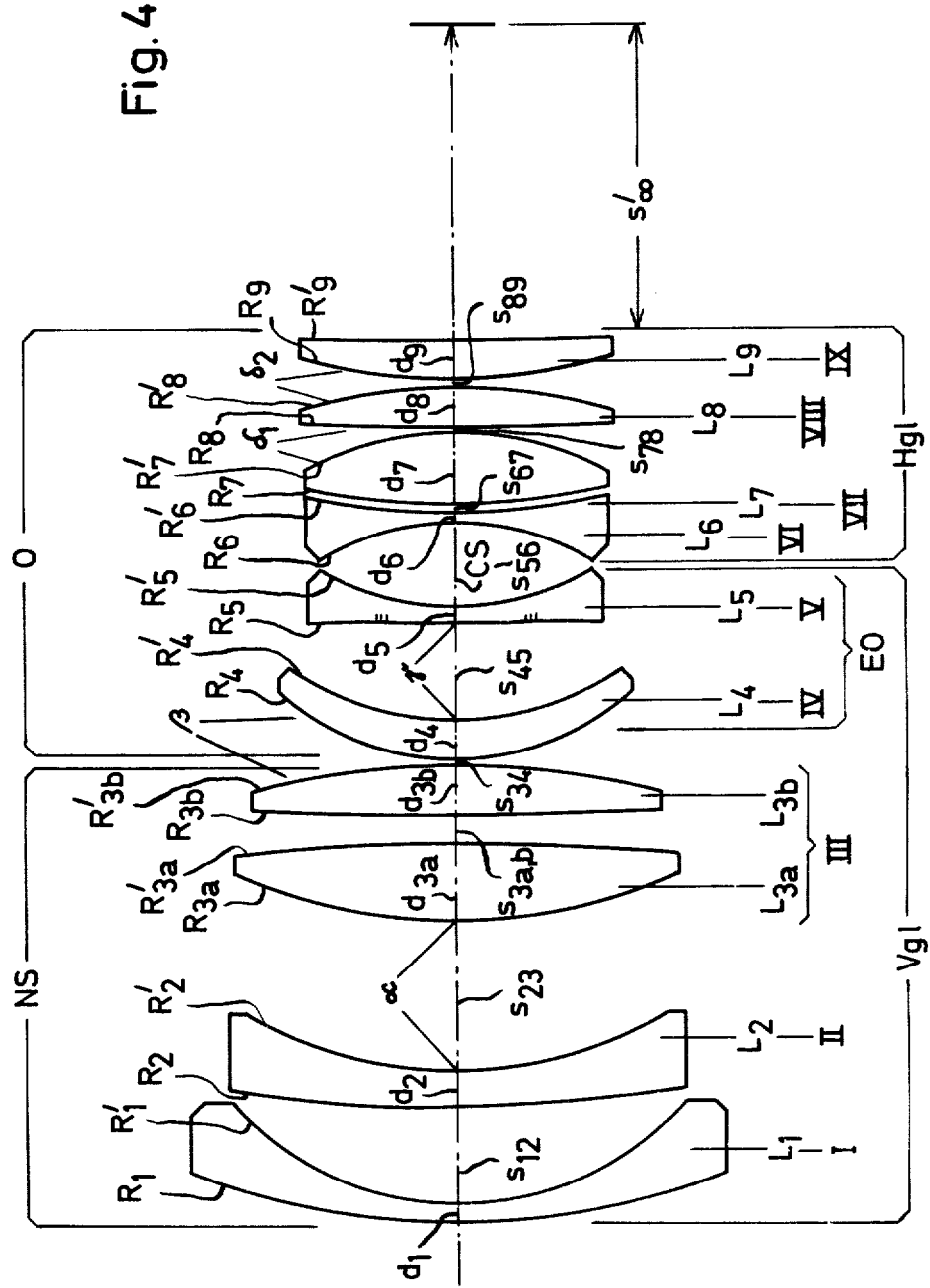

HIGH SPEED WIDE ANGLE LENS SYSTEM

BACKGROUND OF THE INVENTION

This invention relates to an objective for lens systems having extremely high speed and a wide angle of view, useful for photographic and other purposes. It is a lens of the same general type as that disclosed in the present applicant's Glatzel U.S. Pat. No. 3,915,558, granted Oct. 28, 1975, the disclosure of which is incorporated herein by reference. The prior patent may be referred to for convenience as the "main patent," and the present invention may be regarded as an improvement on the main patent. By following certain design principles or rules as set forth below, it is found that an improved image can be produced, as compared with the image produced by the lens of the main patent.

Moreover, the present invention provides a lens of somewhat greater power or speed as compared with the lens of the main patent, and having at least in some examples a somewhat wider field of view than the lens of the main patent, without sacrificing the quality of the image.

BRIEF DESCRIPTION OF THE DRAWINGS

FIG. 1 is a lens diagram illustrating a lens system according to one embodiment of the present invention;

FIG. 2 is a similar diagram illustrating another embodiment;

FIG. 3 is a similar diagram illustrating a third embodiment of the invention; and FIG. 4 is a similar diagram illustrating a fourth embodiment of the invention.

DESCRIPTION OF THE PREFERRED EMBODIMENTS

In describing the lens or objective of the present invention, and illustrating the same in the diagrams, it will be assumed, as customary in lens patents and in scientific literature, that the light is coming from the left of the diagram toward the right thereof. Parts described as being at the front or in the forward portion of the lens are those parts near the left of the diagram, and parts described as being at the rear or back of the lens are those parts near the right of each diagram. Light from a distant object proceeds rightwardly to the front element of the lens, enters the lens system, passes through it, leaves the lens system at the last surface of the last or rearmost element of the system, and forms an image at an image plane to the rear of the last element. The word "lens" is sometimes used with reference to the entire objective or lens system as a whole, and sometimes used with reference to a particular individual lens element or perhaps a group of elements, but in any event the context will make the meaning clear to those skilled in the art.

First describing the present lens in general terms, and deferring until later a discussion of the design rules or characteristics which distinguish this lens from others, the lens may be said in general to have nine components, respectively designated both in the drawings and in the data tables by the consecutive Roman numerals I to IX, inclusive. The individual lens elements are also designated by the letter L with an Arabic numerical subscript corresponding to the number of the component and with a further subscript of "a" or "b" where a particular component is split into two elements. Since most of the components are made of a single individual element, the Arabic numerical subscripts for the individual lens elements will have the same numerical value as the Roman numeral designations of the components. In some examples, however, as well as in FIGS. 1 and 2 of the lens diagrams, the component III is composed of two individual lens elements designated as $L_{3a}$ and $L_{3b}$.

Components I through V may be regarded as the front member of the lens, designated in the tables and the diagrams by the letters "Vgl," and the components VI through IX may be regarded as the rear member of the lens, designated by the letters "Hgl." Between the front member and the rear member (that is, between component V and component VI) is the central space CS.

Now referring in more detail to the various components, the first two components I and II have together a negative power, and preferably both of them are individual elements of negative power, although one of them could be positive provided the combined power of both is negative.

Behind the components I and II is a third component III which is positive, and which is spaced rearwardly from component II to provide between them an air space or air lens $\alpha$ having a diverging action. This component III serves essentially as an ocular for the components I and II, and this component may be either an individual element (see example IV, and FIG. 3 of the diagrams) or a combination of two elements (see FIGS. 1 and 2, and all of the examples except example IV).

This component III is followed in turn by the meniscus component IV having its convex surface toward the front, and spaced from component III to provide between them an air lens $\beta$ having collecting power.

Behind this meniscus member IV is a first negative component V and behind it a second negative component VI, followed in turn by a plurality of positive elements (preferably three in number, designated VII, VIII, and IX) which are air spaced from each other. The negative component V is spaced from the meniscus component IV to provide between them an air lens $\gamma$ of negative or diverging power, and the second negative component VI is spaced from the component V to provide between them an air space of strongly diverging power. The air space between the components VII and VIII is designated as the air lens $\delta_1$ and the air space between the components VIII and IX is designated as the air lens $\delta_2$, both of these air lenses having positive or collecting power.

The positive component III (regardless of whether it is composed of a single element or a combination of two elements has a surface refractive power $\phi_{III}$ which is greater than 1.1765 times the absolute numerical value of the refractive power $\phi_V$ of the negative component V. At the same time, the paraxial surface power sum or lens refractive power $\phi_V$ of this negative component V is less than 0.90 times the surface power sum $\phi_{VI}$ of the second negative element VI in this portion of the lens system. It may be noted again that the component VI is separated from the component V by an air space having the shape of a collecting lens.

In accordance with the customary notation commonly used in this art, and as explained in column 1 of the main patent, the symbol $\phi$ stands for the refractive power or sum of the surface powers of a particular element or component identified by the subscript used with this symbol. Thus $\phi_\beta$ means the refractive power or sum of the surface powers of the air lens $\beta$, and $\phi_\gamma$ means the power of the air lens $\gamma$, and $\phi_{IV}$ means the power of the lens component IV, and so on.

It is an important feature of the present invention that the three positive components VII, VIII, and IX behind the just mentioned negative component VI enclose between them two air spaces or air lenses $\delta_1$ and $\delta_2$ the sum of the surface powers of which (designated $\Sigma\phi_\delta$) is so established that the quotient of this sum divided by the refractive power $\phi_{EO}^+$ is within the limits of 0.88 and 1.60. In this expression, the just mentioned refractive power $\phi_{EO}^+$ represents the refractive power of the collecting air lens between the rear ray exit surface of the Newtonian finder section NS of the lens on the one hand and the front ray entrance surface of the main lens part O on the other hand; in words, the refractive power of the air lens $\beta$. This relationship contributes to solving the problem of a pertinent reduction of the errors of asymmetry of higher order in the extreme wide-open lateral beams.

Another important feature of the invention is the relationship between the paraxial surface powers of the components VII and VIII. It is found that best results are obtained when these two components are so designed that the paraxial surface power $\phi_{VIII}$ of the lens VIII is within the limits of 0.272 and 0.526 times the surface refractive power $\phi_{VII}$ of the lens VII. By observing this relationship between the components VII and VIII, assurance is provided that the positive refractive power of the component VIII further removed from the place of the diaphragm can be kept in such a range relative to the power of the component VII which is closer to the diaphragm, without unfavorably disturbing the desired dioptric harmony established as a result of the first important feature above mentioned, thus avoiding an undesirable increase in the aberrations of higher order in the region of the lateral strongly inclined ray paths.

By complying with these two features or rules above stated, in designing the lens, there is obtained in a simple manner a simultaneous increase in power, and a very sharp focusing efficiency, which is just as surprising as it is welcome, since now the third collecting lens (component IX) at the rear of the system need essentially satisfy only the main task of obtaining the desired strong total deflection in order to achieve the desired high power of the entire system.

In view of what has been said above, it will now be apparent to those skilled in this art that as a result of the new dimensioning ratio above set forth, there is now obtained in a surprising and important manner a pertinent increase in power. When the air lenses are designed in the manner here taught, the lateral courses of the beams in the air lenses can be used, with relatively very large ray inclinations with respect to the optical axis, and at the same time also with respect to the central beam passing through the objective, for a very substantial improvement in the lateral image performance. In this present invention, as compared with the main patent, this utilization is effected for the first time on the two different sides of the large inner central vertex distance, namely, in the object-side entrance part of the main objective part "O" producing the real image on the one hand, and on the side of the part of the rear element of the rear lens part "O" closely adjacent the shorter conjugate on the rear side, on the other hand. By this reciprocal position of application of this specific design rule with respect to the place of the diaphragm, the way is opened to a particularly important increase in performance in the further development of a lens system generally in accordance with the main patent.

Another feature of the present invention is that in this case also, in agreement with the general object of the main patent, the collecting ocular component III of the Newtonian finder part NS can be divided by spliting it into two individual components $L_{3a}$ and $L_{3b}$, preferably separated from each other by an air space, in order to obtain specific additional effects of dioptric corrective action, as described in detail in the specification of the main patent and also shown diagrammatically in the drawings of said main patent.

Eight specific examples are given, all of which are designed in accordance with the design principles above described. In the data tables, all linear measurements such as radii, thicknesses, and spacings are not given as absolute dimensions, but rather are stated as proportions of the equivalent focal length (F) of the entire objective lens system, which is considered as unity. That is, F = 1.00000. The individual lens elements are indicated by the letter L with a subscript corresponding to the number of the individual lens element as already explained.

The notations or symbols used in the data tables and also in the lens diagrams are in accordance with the notations and symbols often used in many lens patents, and will be well understood by those skilled in the art. For instance, the radii of curvature of the front surface and the rear surface of each element are indicated by R and R', respectively, with a subscript indicating the number of that particular element. Positive values of R or R' indicates surfaces convex toward the front of the lens, and negative values indicates surfaces concave toward the front, in accordance with customary usage. The end of the lens toward the distant object or longer conjugate is referred to for convenience as the front, and the end toward the image (that is, toward the camera, if the lens system is used on a photographic camera) is referred to for convenience as the rear of the lens. The light is assumed, in accordance with conventional lens patent practice, to enter from the front, and to pass through the lens from left to right.

The axial thicknesses of individual lens elements are indicated in the tables by the letter "d" with a subscript identifying the particular element. Axial spacings between elements are indicated by the letter "s" likewise with a subscript, but in the case of these spacings, the subscript refers to the identifying number of the lens in front of and the lens behind the space in question. Zero spacing indicates elements cemented to each other. All spacings greater than zero refer to air spacings.

The index of refraction is indicated by "n" with a subscript identifying the lens element, in some of the tables. In other tables, the indices of refraction are given in a column headed $n_d$ for the sake of compactness when the data also include the Abbe number or dispersive index, stated in an adjacent column headed $v_d$. When an objective is designed for use in only a very narrow spectral range, the refractive index refers specifically to this narrow range. If the lens system is to be used over a wide spectral range, as for example in color photography, then instead of monochromatic image error correction, achromatism should be brought out over the wider spectral range required. For this purpose, in known manner, the glasses used in the elements are to be chosen so that the color dispersion of the glasses used serves to eliminate the chromatic deviations or errors due to the wavelengths which enter into consideration.

During the course of development of this invention it was found, by way of confirmation, that upon the development of the so-called preforms or initial forms of the objectives, and then during the course of the following technical rough development to produce a rough form in known manner with the first correction normally customary in the Seidel range (third order), the use of one of the standard refractive indices can take place in a routine manner. A convenient index to use for this purpose is the index of refraction for the yellow d-line of the helium spectrum, with a wavelength of 5876 Angstrom units. Data for this wavelength are customarily shown in many commercial catalogues of manufacturers of optical glasses.

In the heading of each data table there is indicated the figure number of the particular lens diagram which is intended to illustrate the specific example in the table. In this connection it should be borne in mind that the lens diagrams are not intended to be drawn strictly to scale, but are intended merely to furnish a quick visual indication of the general characteristics of the particular specific example. Thus a single lens diagram is sufficient to illustrate two or more specific examples which are of the same general configuration but which may differ somewhat from each other in thicknesses, spacings, curvatures, or other factors.

The specific example tables also indicate, in each case, the relative aperture for which the particular example is intended, expressed as conventional "f" number, and the angular field of view, designated as 2 wo and expressed in degrees, and the back focus from the axial vertex of the last lens element to the focal plane (for an object at infinity) designated as S'oo and expressed in proportion to the equivalent focal length (F) of the entire objective lens system. It may be noted in this connection that in each example, the back focus is greater than the equivalent focal length of the entire system, so that there is sufficient space for the swinging of a mirror, if it is desired to use the lens on a single lens mirror reflex camera.

It has been mentioned above that component III may, if desired, be split into two lens elements, and this is the case in all specific examples except example 4. When this component is split, the adjacent surfaces may be given different signs of curvature, as well as the same sign. The possibility of standardization in favor of a single positive lens surrounded by air on both sides at this place has been made obvious in example 2, in which the splitting is so arranged that the adjacent surfaces of the two elements are provided with radii of curvature which are of the same sign and of the same length, and having the same glass refractive indices.

Another characteristic of the present invention is that, on account of the provision and dimensioning of the two air lenses respectively between components VII and VIII and components VIII and IX, and the provision for a further increase in speed for the wide open bundle cross section, it is no longer necessary to comply with the condition laid down as rule "A" in the main patent. Thus it is now possible, as shown by the specific examples in the present application, to make the second component II as a more strongly refractive negative member than the first component I, instead of making it weaker as required by rule "A" in the main patent. The collecting air lenses between the components VII, VIII, and IX, on account of their different distances from the diaphragm, can provide a suitable compensation effect for the errors in asymmetry resulting from the negative components I and II at different distances in front of the diaphragm, utilizing this in a manner which was both previously unknown and unexpected. With such an advance is possible to utilize both a power-increasing reduction of the aberrations of higher order of the proportions of errors of asymmetry on the one hand as well as a favorable smoothing-down of the course of the residual errors of distortion for a zonal image field region between about 40° and 55° on the other hand, in which correction furthermore there is the possibility of displacing this last mentioned zonal region, depending on the purpose of use, by a few degrees downward or upward. Three of the following examples (examples 3, 6, and 7) are developed in this additional manner, while the remaining examples (examples 1, 2, 4, 5, and 8) are developed in such a manner that the surface power sum $\phi_{II}$ of the negative component II is larger in absolute value than the surface power sum $\phi_I$ of the first negative component I.

The present lens may be advantageously provided with an aspherically shaped surface in order to carry out specific correction processes. Preferably an aspherical surface is used for the front surface of the negative component V, this surface being adjacent to the diaphragm and hence being on a surface of relatively small diameter. The coefficients for the aspherical surface ($R_5$) are shown at the end of the tabular data for each specific example. These coefficients are the coefficients for the usual well known camber expression, as shown for example in column 15 of the main patent. The use of the aspherical shape on the surface $R_5$ to eliminate spherical aberrations for the lateral portions of the wide open beam cross sections, facilitates a comparison between the lens of the present application and the lens of the main patent.

The various examples also provide an indication of the width of the possible variations which can be utilized by the optical designer, for instance with reference to the selection of the type of glass or the like, depending on what specific relative apertures or image-field sizes or what back focus distances are specifically desired.

Also, for the sake of facilitating comparison, a number of glasses have been used uniformly in these examples.

The wide possibilities of variation inherent in the present new principles of design within the scope of the invention can be appreciated by a quick glance at the two data tables, Table I and Table II, which follow the specific example tables. The headings of these Tables I and II agree with the designations previously used in the foregoing description. The refractive power of the entire system is $\Phi$.

In considering the various numerical values given in the various tables and elsewhere, it should be borne in mind that customarily a tolerance of plus or minus 5% is allowable.

Example 1.) (FIG. 1)
F = 1.0000 f/1.27 $2\omega_0 = 60°$ $s'_\infty = + 1.02696$ F

| Lens | | Radii | Thicknesses and spacings | | |
|---|---|---|---|---|---|
| I | $L_1$ | $R_1 = + 2.74228$ | $d_1 = 0.130003$ | $n_1 = 1.63932$ | |
| | | $R'_1 = + + 1.03947$ | $s_{12} = 0.286084$ | | |
| II | $L_2$ | $R_2 = + 6.48164$ | $d_2 = 0.087002$ | $n_2 = 1.62242$ | |
| | | $R'_2 = + 1.17691$ | $s_{23} = 0.420510$ ($\alpha$) | | NS |
| III | $L_{3a}$ | $R_{3a} = + 1.80649$ | $d_{3a} = 0.270430$ | $n_{3a} = 1.76121$ | |
| | | $R'_{3a} = - 7.56390$ | $s_{3a,b} = 0.096156$ | | Vgl |
| | $L_{3b}$ | $R_{3b} = + 15.5044$ | $d_{3b}{}^\delta 0.172658$ | $n_{3b} = 1.75071$ | |
| | | $R'_{3b} = - 2.47289$ | | | |
| | | | $s_{34} = 0.002039$ ($\beta$) | | |
| IV | $L_4$ | $R_4 = + 0.79945$ | $d_4 = 0.123465$ | $n_4 = 1.71300$ | |
| | | $R'_4 = + 0.93950$ | $s_{45} = 0.366701$ ($\gamma$) | | EO |
| V | $L_5$ | $R_5 = + 41.9532$ | $d_5 = 0.066732$ | $n_5 = 1.50847$ | |
| | | $R'_5 = + 1.04954$ | CS = $s_{56} = 0.210505$ | | |
| | | | | | 0 |
| VI | $L_6$ | $R_6 = - 1.31336$ | $d_6 = 0.041809$ | $n_6 = 1.84666$ | |
| | | $R'_6 = + 1.05785$ | $s_{67} = 0$ | | 0 |
| VII | $L_7$ | $R_7 = + 1.05785$ | $d_7 = 0.295507$ | $n_7 = 1.78831$ | |
| | | $R'_7 = - 1.38749$ | $s_{78} = 0.002000$ ($\delta_1$) | | Hgl |
| VIII | $L_8$ | $R_8 = + 12.9863$ | $d_8 = 0.132465$ | $n_8 = 1.77364$ | |
| | | $R'_8 = - 2.31790$ | $s_{89} = 0.002308$ ($\delta_2$) | | |
| IX | $L_9$ | $R_9 = + 4.07109$ | $d_9 = 0.135926$ | $n_9 = 1.76694$ | |
| | | $R'_9 = - 3.72269$ | | | |

Aspherical surfaces: $R_5$ with $c_1 = (2 \cdot R_5)^{-1}$, $c_2 = -3.964812 \cdot 10^{-1}$, $c_3 = c_4 = c_5 = 0$.

Example 2.) (FIG.2)
F = 1.0000 f/1.26 $2\omega_0 = 60°$ $s'_\infty = + 1.04042$ F

| Lens | | Radii | Thicknesses and spacings | | |
|---|---|---|---|---|---|
| I | $L_1$ | $R_1 = + 2.52595$ | $d_1 = 0.128446$ | $n_1 = 1.68273$ | |
| | | $R'_1 = + 1.09628$ | $s_{12} = 0.315556$ | | |
| II | $L_2$ | $R_2 = + 6.34487$ | $d_2 = 0.119628$ | $n_2 = 1.65016$ | |
| | | $R'_2 = + 1.41026$ | $s_{23} = 0.488096$ ($\alpha$) | | NS |
| III | $L_{3a}$ | $R_{3a} = + 1.98000$ | $d_{3a} = 0.236000$ | $n_{3a} = 1.78600$ | |
| | | $R'_{3a} = - 7.46531$ | $s_{3a,b} = 0.010000$ | | Vgl |
| | $L_{3b}$ | $R_{3b} = - 7.46531$ | $d_{3b} = 0.104413$ | $n_{3b} = 1.78600$ | |
| | | $R'_{3b} = - 2.08006$ | | | |
| | | | $s_{34} = 0.003068$ ($\beta$) | | |
| IV | $L_4$ | $R_4 = + 0.88344$ | $d_4 = 0.195929$ | $n_4 = 1.71700$ | |
| | | $R'_4 = + 1.02017$ | $s_{45} = 0.337795$ ($\gamma$) | | EO |

-continued

Example 2.) (FIG.2)
$F = 1.0000 \ f/1.26 \ 2\omega_0 = 60° \ s'_\infty = + 1.04042 \ F$

| Lens | | Radii | Thicknesses and spacings | | |
|---|---|---|---|---|---|
| V | $L_5$ | $R_5 = + 5.69393$ | $d_5 = 0.062498$ | $n_5 = 1.54814$ | |
| | | $R'_5 = + 0.95622$ | $CS = s_{56} = 0.233887$ | | |
| VI | $L_6$ | $R_6 = - 0.90273$ | $d_6 = 0.047161$ | $n_6 = 1.84666$ | |
| | | $R'_6 = + 2.14068$ | $s_{67} = 0$ | | |
| VII | $L_7$ | $R_7 = + 2.14068$ | $d_7 = 0.253442$ | $n_7 = 1.78831$ | |
| | | $R'_7 = - 1.11219$ | $s_{78} = 0.002301 \ (\delta_1)$ | | Hgl |
| VIII | $L_8$ | $R_8 = + 10.49963$ | $d_8 = 0.137648$ | $n_8 = 1.71300$ | |
| | | $R'_8 = - 1.78824$ | $s_{89} = 0.002300 \ (\delta_2)$ | | |
| IX | $L_9$ | $R_9 = + 3.34428$ | $d_9 = 0.134965$ | $n_9 = 1.73350$ | |
| | | $R'_9 = - 3.80673$ | | | |

Aspherical surfaces: $R_5$ with $c_1 = (2 \cdot R_5)^{-1}$, $c_2 = -3.841760 \cdot 10^{-1}$, $c_3 = c_4 = c_5 = 0$.

Example 3.) (FIG. 1)
$F = 1.0000 \ f/1.26 \ 2\omega_0 = 62° \ s'_\infty = + 1.03465 \ F$

| Lens | | Radii | Thicknesses and spacings | | |
|---|---|---|---|---|---|
| I | $L_1$ | $R_1 = + 2.35979$ | $d_1 = 0.076463$ | $n_1 = 1.68273$ | |
| | | $R'_1 = + + 1.02872$ | $s_{12} = 0.307508$ | | |
| II | $L_2$ | $R_2 = + 4.81446$ | $d_2 = 0.112234$ | $n_2 = 1.64947$ | |
| | | $R'_2 = + 1.55048$ | $s_{23} = 0.509075 \ (\alpha)$ | | NS |
| III | $L_{3a}$ | $R_{3a} = + 1.79124$ | $d_{3a} = 0.257776$ | $n_{3a} = 1.73797$ | |
| | | $R'_{3a} = - 7.52983$ | $s_{3a,b} = 0.077079$ | | Vgl |
| | $L_{3b}$ | $R_{3b} = + 10.2924$ | $d_{3b} {}^\delta 0.171235$ | $n_{3b} = 1.71300$ | |
| | | $R'_{3b} = - 3.28521$ | | | |
| | | | $s_{34} = 0.002039 \ (\beta)$ | | |
| IV | $L_4$ | $R_4 = + 0.83559$ | $d_4 = 0.130965$ | $n_4 = 1.71300$ | |
| | | $R'_4 = + 0.98843$ | $s_{45} = 0.318777 \ (\gamma)$ | | EO |
| V | $L_5$ | $R_5 = + 5.71180$ | $d_5 = 0.059117$ | $n_5 = 1.52124$ | |
| | | $R'_5 = + 0.85253$ | $CS = s_{56} = 0.251891$ | | |
| VI | $L_6$ | $R_6 = - 0.83756$ | $d_6 = 0.042578$ | $n_6 = 1.83757$ | |
| | | $R'_6 = + 1.90424$ | $s_{67} = 0$ | | |
| VII | $L_7$ | $R_7 = + 1.90424$ | $d_7 = 0.263199$ | $n_7 = 1.78831$ | |
| | | $R'_7 = - 1.07201$ | $s_{78} = 0.002231 \ (\delta_1)$ | | Hgl |
| VIII | $L_8$ | $R_8 = + 8.41147$ | $d_8 = 0.146619$ | $n_8 = 1.71300$ | |
| | | $R'_8 = - 1.53136$ | $s_{89} = 0.002039 \ (\delta_2)$ | | |

-continued

Example 3.) (FIG. 1)
$F = 1.0000\ f/1.26\ 2\omega_0 = 62°\ s'_\infty = +1.03465\ F$

| Lens | | Radii | Thicknesses and spacings | |
|---|---|---|---|---|
| IX | $L_9$ | $R_9 = +2.90643$ | $d_9 = 0.130196$ | $n_9 = 1.74997$ |
| | | $R'_9 = -11.65312$ | | |

Aspherical surfaces: $R_5$ with $c_1 = (2 \cdot R_5)^{-1}$, $c_2 = -3.995362 \cdot 10^{-1}$, $c_3 = c_4 = c_5 = 0$.

Example 4.) (FIG. 3)
$F = 1.0000\ f/1.25\ 2\omega_o = 60°\ s'_\infty = +1.04042\ F$

| Lens | | Radii | Thicknesses and spacings | |
|---|---|---|---|---|
| I | $L_1$ | $R_1 = +2.52595$ | $d_1 = 0.128446$ | $n_1 = 1.68273$ |
| | | $R'_1 = +1.09628$ | $s_{12} = 0.315556$ | |
| II | $L_2$ | $R_2 = +6.34487$ | $d_2 = 0.119628$ | $n_2 = 1.65016$ |
| | | $R'_2 = +1.41026$ | $s_{23} = 0.488096\ (\alpha)$ | |
| III | $L_3$ | $R_3 = +1.98000$ | $d_3 = 0.340413$ | $n_3 = 1.78600$ |
| | | $R'_3 = -2.08006$ | $s_{34} = 0.003068\ (\beta)$ | |
| IV | $L_4$ | $R_4 = +0.88344$ | $d_4 = 0.195929$ | $n_4 = 1.71700$ |
| | | $R'_4 = +1.02017$ | $s_{45} = 0.337795\ (\gamma)$ | |
| V | $L_5$ | $R_5 = +5.69393$ | $d_5 = 0.062498$ | $n_5 = 1.54814$ |
| | | $R'_5 = +0.95622$ | $CS = s_{56} = 0.233887$ | |
| VI | $L_6$ | $R_6 = -0.90273$ | $d_6 = 0.047161$ | $n_6 = 1.84666$ |
| | | $R'_6 = +2.14068$ | $s_{67} = 0$ | |
| VII | $L_7$ | $R_7 = +2.14068$ | $d_7 = 0.253442$ | $n_7 = 1.78831$ |
| | | $R'_7 = -1.11219$ | $s_{78} = 0.002301\ (\delta_1)$ | |
| VIII | $L_8$ | $R_8 = +10.4996$ | $d_8 = 0.137648$ | $n_8 = 1.71300$ |
| | | $R'_8 = -1.78824$ | $s_{89} = 0.002300\ (\delta_2)$ | |
| IX | $L_9$ | $R_9 = +3.34428$ | $d_9 = 0.134965$ | $n_9 = 1.73350$ |
| | | $R'_9 = -3.80673$ | | |

Aspherical surfaces: $R_5$ with $c_1 = (2 \cdot R_5)^{-1}$, $c_2 = -2.1655465 \cdot 10^{-5}$, $c_3 = c_4 = c_5 = 0$.

Example 5.) (FIG.4)
$F = 1.00000\ f/1.24\ 2\omega_o = 60°\ s'_\infty = +1.02698\ F$

| Lens | | Radii | Thicknesses and spacings | $n_d/\nu_d$ |
|---|---|---|---|---|
| I | $L_1$ | $R_1 = +2.28038$ | $d_1 = 0.075649$ | 1.68273/44.51 |
| | | $R'_1 = +1.03603$ | $s_{12} = 0.309443$ | |
| II | $L_2$ | $R_2 = +5.64519$ | $d_2 = 0.101032$ | 1.65844/50.88 |
| | | $R'_2 = +1.33972$ | $s_{23} = 0.445243\ (\alpha)$ | |

-continued
Example 5.) (FIG.4)
$F = 1.00000$  $f/1.24$  $2\omega_o = 60°$  $s'_\infty = + 1.02698$ F

| Lens | | Radii | Thicknesses and spacings | $n_d/\nu_d$ | |
|---|---|---|---|---|---|
| III | $L_{3a}$ | $R_{3a} = + 1.75286$ | $d_{3a} = 0.272561$ | 1.71300/53.85 | Vgl |
| | | $R'_{3a} = - 5.54731$ | $s_{3a,b} = 0.070650$ | | |
| | $L_{3b}$ | $R_{3b} = + 15.1975$ | $d_{3b} = 0.170567$ | 1.71300/53.85 | |
| | | $R'_{3b} = - 2.90250$ | | | |
| | | | $s_{34} = 0.002231$ ($\beta$) | | |
| IV | $L_4$ | $R_4 = + 0.81191$ | $d_4 = 0.131338$ | 1.71300/53.85 | |
| | | $R'_4 = + 0.99154$ | $s_{45} = 0.317020$ ($\gamma$) | EO | |
| V | $L_5$ | $R_5 = + 8.48566$ | $d_5 = 0.061919$ | 1.50847/61.19 | |
| | | $R'_5 = + 0.90007$ | CS = $s_{56} = 0.249562$ | | |
| VI | $L_6$ | $R_6 = - 0.97119$ | $d_6 = 0.041959$ | 1.84666/23.82 | |
| | | $R'_6 = + 1.68540$ | $s_{67} = 0$ | | |
| VII | $L_7$ | $R_7 = + 1.68540$ | $d_7 = 0.264753$ | 1.78831/47.37 | |
| | | $R'_7 = - 1.16566$ | $s_{78} = 0.002000$ ($\delta_1$) | | Hgl |
| VIII | $L_8$ | $R_8 = - 52.9668$ | $d_8 = 0.138453$ | 1.71300/53.85 | |
| | | $R'_8 = - 1.47025$ | $s_{89} = 0.002654$ ($\delta_2$) | | |
| IX | $L_9$ | $R_9 = + 2.09194$ | $d_9 = 0.131108$ | 1.73350/51.65 | |
| | | $R'_9 = + 109.081$ | | | |

Aspherical surfaces: $R_5$ with $c_1 = (2 \cdot R_5)^{-1}$, $c_2 = -3.7736161 \cdot 10^{-1}$, $c_3 = c_4 = c_5 = 0$.

Example 6.) (FIG. 1)
$F = 1.00000$  $f/1.24$  $2\omega_o = 60°$  $s'_\infty = + 1.04162$ F

| Lens | | Radii | Thicknesses and spacings | $n_d/\nu_d$ | |
|---|---|---|---|---|---|
| I | $L_1$ | $R_1 = + 2.37259$ | $d_1 = 0.082227$ | 1.68273/44.51 | |
| | | $R'_1 = + 1.05220$ | $s_{12} = 0.323144$ | | |
| II | $L_2$ | $R_2 = + 5.42735$ | $d_2 = 0.115655$ | 1.65016/39.14 | |
| | | $R'_2 = + 1.49703$ | $s_{23} = 0.478375$ ($\alpha$) | NS | |
| III | $L_{3a}$ | $R_{3a} = + 1.96776$ | $d_{3a} = 0.266661$ | 1.74400/44.77 | |
| | | $R'_{3a} = - 9.79152$ | $s_{3a,b} = 0.096059$ | | Vgl |
| | $L_{3b}$ | $R_{3b} = + 7.89031$ | $d_{3b} = 0.190582$ | 1.71300/53.85 | |
| | | $R'_{3b} = - 2.90218$ | | | |
| | | | $s_{34} = 0.003074$ ($\beta$) | | |
| IV | $L_4$ | $R_4 = + 0.86642$ | $d_4 = 0.161764$ | 1.71700/47.99 | |
| | | $R'_4 = + 1.00774$ | $s_{45} = 0.330828$ ($\gamma$) | EO | |
| V | $L_5$ | $R_5 = + 5.70604$ | $d_5 = 0.059557$ | 1.54814/45.75 | |
| | | $R'_5 = + 0.90465$ | CS = $s_{56} = 0.249370$ | | |

-continued

Example 6.) (FIG. 1)
$F = 1.00000$ f/1.24 $2\omega_o = 60°$ $s'_\infty = + 1.04162$ F

| Lens | | Radii | Thicknesses and spacings | $n_d/\nu_d$ | |
|---|---|---|---|---|---|
| VI | $L_6$ | $R_6 = - 0.82980$ | $d_6 = 0.041498$ | 1.84666/23.82 | |
| | | $R'_6 = + 2.54792$ | $s_{67} = 0$ | | 0 |
| VII | $L_7$ | $R_7 = + 2.54792$ | $d_7 = 0.255134$ | 1.78831/47.37 | |
| | | $R'_7 = - 1.03717$ | $s_{78} = 0.003842\ (\delta_1)$ | Hgl | |
| VIII | $L_8$ | $R_8 = + 9.51371$ | $d_8 = 0.139478$ | 1.71300/53.85 | |
| | | $R'_8 = - 1.77821$ | $s_{89} = 0.003074\ (\delta_2)$ | | |
| IX | $L_9$ | $R_9 = + 3.05211$ | $d_9 = 0.139862$ | 1.73350/51.65 | |
| | | $R'_9 = - 4.40528$ | | | |

Aspherical surfaces: $R_5$ with $c_1 = (2 \cdot R_5)^{-1}$, $c_2 = -3.4253170 \cdot 10^{-1}$, $c_3 = c_4 = c_5 = 0$.

Example 7.) (FIG. 4)
$F = 1.00000$ f/1.24 $2\omega_o = 60°$ $s'_\infty = + 1.02697$ F

| Lens | | Radii | Thicknesses and spacings | $n_d/\nu_d$ | |
|---|---|---|---|---|---|
| I | $L_1$ | $R_1 = + 2.25420$ | $d_1 = 0.075309$ | 1.68273/44.51 | |
| | | $R'_1 = + 1.01132$ | $s_{12} = 0.314043$ | | |
| II | $L_2$ | $R_2 = + 4.58177$ | $d_2 = 0.122848$ | 1.65844/50.88 | |
| | | $R'_2 = + 1.38713$ | $s_{23} = 0.491084\ (\alpha)$ | NS | |
| III | $L_{3a}$ | $R_{3a} = + 1.79457$ | $d_{3a} = 0.257427$ | 1.71300/53.85 | |
| | | $R'_{3a} = - 6.95357$ | $s_{3a,b} = 0.087963$ | | Vgl |
| | $L_{3b}$ | $R_{3b} = + 12.9780$ | $d_{3b} = 0.173580$ | 1.71300/53.85 | |
| | | $R'_{3b} = - 2.78172$ | | | |
| | | | $s_{34} = 0.002769\ (\beta)$ | | |
| IV | $L_4$ | $R_4 = + 0.81634$ | $d_4 = 0.139656$ | 1.71300/53.85 | |
| | | $R'_4 = + 0.94692$ | $s_{45} = 0.317428\ (\gamma)$ | EO | |
| V | $L_5$ | $R_5 = + 5.71174$ | $d_5 = 0.059347$ | 1.50847/61.19 | |
| | | $R'_5 = + 0.90726$ | CS = $s_{56} = 0.264389$ | | |
| | | | | | 0 |
| VI | $L_6$ | $R_6 = - 0.89844$ | $d_6 = 0.042808$ | 1.84666/23.82 | |
| | | $R'_6 = + 1.92688$ | $s_{67} = 0$ | | 0 |
| VII | $L_7$ | $R_7 = + 1.92688$ | $d_7 = 0.265119$ | 1.78831/47.37 | |
| | | $R'_7 = - 1.08960$ | $s_{78} = 0.003269\ (\delta_1)$ | Hgl | |
| VIII | $L_8$ | $R_8 = + 20.6329$ | $d_8 = 0.150656$ | 1.71300/53.85 | |
| | | $R'_8 = - 1.51790$ | $s_{89} = 0.005000\ (\delta_2)$ | | |
| IX | $L_9$ | $R_9 = + 2.13877$ | $d_9 = 0.136848$ | 1.73350/51.65 | |
| | | $R'_9 = - 20.7200$ | | | |

Aspherical surfaces: $R_5$ with $c_1 = (2 \cdot R_5)^{-1}$, $c_2 = -3.8265852 \cdot 10^{-1}$, $c_3 = -5.9537649 \cdot 10^{-2}$, $c_4 = c_5 = 0$.

Example 8.) (FIG. 1)
$F = 1.00000$ $f/1.23$ $2\omega_0 = 60°$ $s'_\infty = + 1.02697 F$

| Lens | | Radii | Thicknesses and spacings | $n_d/\nu_d$ | | |
|---|---|---|---|---|---|---|
| I | $L_1$ | $R_1 = + 2.52595$ | $d_1 = 0.128446$ | 1.68273/44.51 | | |
|  |  | $R'_1 = + 1.09628$ | $s_{12} = 0.315556$ |  | | |
| II | $L_2$ | $R_2 = + 6.34487$ | $d_2 = 0.119628$ | 1.65016/39.14 | | |
|  |  | $R'_2 = + 1.41026$ | $s_{23} = 0.488096\ (\alpha)$ |  | NS | |
| III | $L_{3a}$ | $R_{3a} = + 2.00645$ | $d_{3a} = 0.230053$ | 1.74400/44.77 | | |
|  |  | $R'_{3a} = - 10.0560$ | $s_{3a,b} = 0.084353$ |  | Vgl | |
|  | $L_{3b}$ | $R_{3b} = + 9.35780$ | $d_{3b} = 0.173307$ | 1.71300/53.85 | | |
|  |  | $R'_{3b} = - 2.81386$ | $s_{34} = 0.003068\ (\beta)$ |  | | |
| IV | $L_4$ | $R_4 = + 0.88344$ | $d_4 = 0.195929$ | 1.71700/47.99 | | |
|  |  | $R'_4 = + 1.02017$ | $s_{45} = 0.337795\ (\gamma)$ |  | EO | |
| V | $L_5$ | $R_5 = + 5.69393$ | $d_5 = 0.062498$ | 1.54814/45.75 | | |
|  |  | $R'_5 = + 0.95622$ | $CS = s_{56} = 0.233887$ |  | | |
| VI | $L_6$ | $R_6 = - 0.90273$ | $d_6 = 0.047161$ | 1.84666/23.82 | | |
|  |  | $R'_6 = + 2.14068$ | $s_{67} = 0$ |  | | O |
| VII | $L_7$ | $R_7 = + 2.14068$ | $d_7 = 0.253442$ | 1.78831/47.37 | | |
|  |  | $R'_7 = - 1.11219$ | $s_{78} = 0.002301\ (\delta_1)$ |  | Hgl | |
| VIII | $L_8$ | $R_8 = + 10.4996$ | $d_8 = 0.137648$ | 1.71300/53.85 | | |
|  |  | $R'_8 = - 1.78824$ | $s_{89} = 0.002300\ (\delta_2)$ |  | | |
| IX | $L_9$ | $R_9 = + 3.34428$ | $d_9 = 0.134965$ | 1.73350/51.65 | | |
|  |  | $R'_9 = - 3.80673$ |  |  | | |

Aspherical surfaces: $R_5$ with $c_1 = (2 \cdot R_5)^{-1}$, $c_2 = -3.8418157 \cdot 10^{-1}$, $c_3 = c_4 = c_5 = 0$.

What is claimed is:

1. A high speed wide angle lens system consisting of components numbered I through IX consecutively from front to rear, grouped as a front member (Vgl) and a rear member (Hgl) with the first two components I and II collectively forming a negative group followed by a positive component III, components I, II, and III forming a Newtonian finder part (NS), followed with an air lens space by a main lens part (O) the first component of which (IV) is a positive meniscus with its front surface convex toward the front, followed by a negative component (V) and another negative component (VI) air spaced from each other and shaped to provide a strongly dispersing air lens space between them, followed by a plurality of positive components (VII, VIII, and IX( air spaced from each other to provide air lenses $\delta_1$ and $\delta_2$ of collecting power, the component III having a surface power ($\phi_{III}$) which is more than the absolute numerical value of the refractive power ($\phi_V$) of the negative component V, said component V having a paraxial surface power ($\phi_V$) less than the surface power ($\phi_{VI}$) of the negative component VI, characterized by the fact that the quotient of the sum of the surface powers of said last mentioned air lens $\delta_1$ and $\delta_2$ ($\phi\delta_1 + \phi\delta_2 = \Sigma\phi\delta$) divided by the refractive power ($\phi_{EO}{}^+$) of the air lens between the components III and IV is within the limits of 0.96189 and 1.44233, and further characterized by the fact that the paraxial surface power sum ($\phi_{VIII}$) of said component VIII is within the limits of 0.29949 and 0.47886 times the paraxial surface power sum ($\phi_{VII}$) of said component VII.

2. A lens system as defined in claim 1, wherein said component III is divided by splitting into two individual lens elements $L_{3a}$ and $L_{3b}$.

3. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

| Lens | Radii | Thicknesses and spacings | | |
|---|---|---|---|---|
| | | $F = 1.0000$ $f/1.27$ $2\omega_0 = 60°$ $s'_\infty = + 1.02696\,F$ | | |
| I $L_1$ | $R_1 = + 2.74228$ | $d_1 = 0.130003$ | $n_1 = 1.63932$ | |
| | $R'_1 = + + 1.03947$ | $s_{12} = 0.286084$ | | |
| II $L_2$ | $R_2 = + 6.48164$ | $d_2 = 0.087002$ | $n_2 = 1.62242$ | |
| | $R'_2 = + 1.17691$ | $s_{23} = 0.420510\,(\alpha)$ | | NS |
| III $L_{3a}$ | $R_{3a} = + 1.80649$ | $d_{3a} = 0.270430$ | $n_{3a} = 1.76121$ | |
| | $R'_{3a} = - 7.56390$ | $s_{3a,b} = 0.096156$ | | Vgl |
| $L_{3b}$ | $R_{3b} = + 15.5044$ | $d_{3b} = 0.172658$ | $n_{3b} = 1.75071$ | |
| | $R'_{3b} = - 2.47289$ | | | |
| | | $s_{34} = 0.002039\,(\beta)$ | | |
| IV $L_4$ | $R_4 = + 0.79945$ | $d_4 = 0.123465$ | $n_4 = 1.71300$ | |
| | $R'_4 = + 0.93950$ | $s_{45} = 0.366701\,(\gamma)$ | | EO |
| V $L_5$ | $R_5 = + 41.9532$ | $d_5 = 0.066732$ | $n_5 = 1.50847$ | |
| | $R'_5 = + 1.04954$ | $CS = s_{56} = 0.210505$ | | |
| VI $L_6$ | $R_6 = - 1.31336$ | $d_6 = 0.041809$ | $n_6 = 1.84666$ | |
| | $R'_6 = + 1.05785$ | $s_{67} = 0$ | | |
| VII $L_7$ | $R_7 = + 1.05785$ | $d_7 = 0.295507$ | $n_7 = 1.78831$ | |
| | $R'_7 = - 1.38749$ | $s_{78} = 0.002000\,(\delta_1)$ | | Hgl |
| VIII $L_8$ | $R_8 = + 12.9863$ | $d_8 = 0.132465$ | $n_8 = 1.77364$ | |
| | $R'_8 = - 2.31790$ | $s_{89} = 0.002308\,(\delta_2)$ | | |
| IX $L_9$ | $R_9 = + 4.07109$ | $d_9 = 0.135926$ | $n_9 = 1.76694$ | |
| | $R'_9 = - 3.72269$ | | | |

Aspherical surfaces: $R_5$ with $c_1 = (2 \cdot R_5)^{-1}$, $c_2 = -3.964812 \cdot 10^{-1}$, $c_3 = c_4 = c_5 = 0$.

4. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

| Lens | Radii | Thicknesses and spacings | | |
|---|---|---|---|---|
| | | $F = 1.0000$ $f/1.26$ $2\omega_0 = 60°$ $s'_\infty = + 1.04042\,F$ | | |
| I $L_1$ | $R_1 = + 2.52595$ | $d_1 = 0.128446$ | $n_1 = 1.68273$ | |
| | $R'_1 = + 1.09628$ | $s_{12} = 0.315556$ | | |
| II $L_2$ | $R_2 = + 6.34487$ | $d_2 = 0.119628$ | $n_2 = 1.65016$ | |
| | $R'_2 = + 1.41026$ | $s_{23} = 0.488096\,(\alpha)$ | | NS |
| III $L_{3a}$ | $R_{3a} = + 1.98000$ | $d_{3a} = 0.236000$ | $n_{3a} = 1.78600$ | |
| | $R'_{3a} = - 7.46531$ | $s_{3a,b} = 0.010000$ | | Vgl |
| $L_{3b}$ | $R_{3b} = - 7.46531$ | $d_{3b} = 0.104413$ | $n_{3b} = 1.78600$ | |
| | $R'_{3b} = - 2.08006$ | | | |
| | | $s_{34} = 0.003068\,(\beta)$ | | |

-continued

| Lens | | Radii | Thicknesses and spacings | | | |
|---|---|---|---|---|---|---|
| \multicolumn{7}{l}{$F = 1.0000\ f/1.26\ 2\omega_0 = 60°\ s'_\infty = +1.04042\ F$} |
| IV | $L_4$ | $R_4 = +0.88344$ | $d_4 = 0.195929$ | $n_4 = 1.71700$ | | |
| | | $R'_4 = +1.02017$ | $s_{45} = 0.337795\ (\gamma)$ | | EO | |
| V | $L_5$ | $R_5 = +5.69393$ | $d_5 = 0.062498$ | $n_5 = 1.54814$ | | |
| | | $R'_5 = +0.95622$ | $CS = s_{56} = 0.233887$ | | | |
| VI | $L_6$ | $R_6 = -0.90273$ | $d_6 = 0.047161$ | $n_6 = 1.84666$ | | |
| | | $R'_6 = +2.14068$ | $s_{67} = 0$ | | | |
| VII | $L_7$ | $R_7 = +2.14068$ | $d_7 = 0.253442$ | $n_7 = 1.78831$ | | |
| | | $R'_7 = -1.11219$ | $s_{78} = 0.002301\ (\delta_1)$ | | Hgl | |
| VIII | $L_8$ | $R_8 = +10.49963$ | $d_8 = 0.137648$ | $n_8 = 1.71300$ | | |
| | | $R'_8 = -1.78824$ | $s_{89} = 0.002300\ (\delta_2)$ | | | |
| IX | $L_9$ | $R_9 = +3.34428$ | $d_9 = 0.134965$ | $n_9 = 1.73350$ | | |
| | | $R'_9 = -3.80673$ | | | | |

Aspherical surfaces: $R_5$ with $c_1 = (2 \cdot R_5)^{-1}$, $c_2 = -3.841760 \cdot 10^{-1}$, $c_3 = c_4 = c_5 = 0$.

5. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

| Lens | | Radii | Thicknesses and spacings | | | |
|---|---|---|---|---|---|---|
| \multicolumn{7}{l}{$F = 1.0000\ f/1.26\ 2\omega_0 = 62°\ s'_\infty = +1.03465\ F$} |
| I | $L_1$ | $R_1 = +2.35979$ | $d_1 = 0.076463$ | $n_1 = 1.68273$ | | |
| | | $R'_1 = +1.02872$ | $s_{12} = 0.307508$ | | | |
| II | $L_2$ | $R_2 = +4.81446$ | $d_2 = 0.112234$ | $n_2 = 1.64947$ | | |
| | | $R'_2 = +1.55048$ | $s_{23} = 0.509075\ (\alpha)$ | | NS | |
| III | $L_{3a}$ | $R_{3a} = +1.79124$ | $d_{3a} = 0.257776$ | $n_{3a} = 1.73797$ | | |
| | | $R'_{3a} = -7.52983$ | $s_{3a,b} = 0.077079$ | | | Vgl |
| | $L_{3b}$ | $R_{3b} = +10.2924$ | $d_{3b} = 0.171235$ | $n_{3b} = 1.71300$ | | |
| | | $R'_{3b} = -3.28521$ | | | | |
| | | | $s_{34} = 0.004885\ (\beta)$ | | | |
| IV | $L_4$ | $R_4 = +0.83559$ | $d_4 = 0.130965$ | $n_4 = 1.71300$ | | |
| | | $R'_4 = +0.98843$ | $s_{45} = 0.318777\ (\gamma)$ | | EO | |
| V | $L_5$ | $R_5 = +5.71180$ | $d_5 = 0.059117$ | $n_5 = 1.52124$ | | |
| | | $R'_5 = +0.85253$ | $CS = s_{56} = 0.251891$ | | | |
| VI | $L_6$ | $R_6 = -0.83756$ | $d_6 = 0.042578$ | $n_6 = 1.83757$ | | |
| | | $R'_6 = +1.90424$ | $s_{67} = 0$ | | | |

-continued $F = 1.0000\ f/1.26\ 2\omega_0 = 62°\ s'_\infty = +\ 1.03465\ F$

| Lens | Radii | Thicknesses and spacings | | |
|---|---|---|---|---|
| VII $L_7$ | $R_7 = +\ 1.90424$ | $d_7 = 0.263199$ | $n_7 = 1.78831$ | |
| | $R'_7 = -\ 1.07201$ | $s_{78} = 0.002231\ (\delta_1)$ | | Hgl |
| VIII $L_8$ | $R_8 = +\ 8.41147$ | $d_8 = 0.146619$ | $n_8 = 1.71300$ | |
| | $R'_8 = -\ 1.53136$ | $s_{89} = 0.002039\ (\delta_2)$ | | |
| IX $L_9$ | $R_9 = +\ 2.90643$ | $d_9 = 0.130196$ | $n_9 = 1.74997$ | |
| | $R'_9 = -\ 11.65312$ | | | |

Aspherical surfaces: $R_5$ with $c_1 = (2 \cdot R_5)^{-1}$, $c_2 = -3.995362 \cdot 10^{-1}$, $c_3 = c_4 = c_5 = 0$.

6. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

7. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

$F = 1.0000\ f/1.25\ 2\omega_0 = 60°\ s'_\infty = +\ 1.04042\ F$

| Lens | Radii | Thicknesses and spacings | | |
|---|---|---|---|---|
| I $L_1$ | $R_1 = +\ 2.52595$ | $d_1 = 0.128446$ | $n_1 = 1.68273$ | |
| | $R'_1 = +\ +\ 1.09628$ | $s_{12} = 0.315556$ | | |
| II $L_2$ | $R_2 = +\ 6.34487$ | $d_2 = 0.119628$ | $n_2 = 1.65016$ | |
| | $R'_2 = +\ 1.41026$ | $s_{23} = 0.488096\ (\alpha)$ | | NS |
| III $L_3$ | $R_3 = +\ 1.98000$ | $d_3 = 0.340413$ | $n_3 = 1.78600$ | |
| | $R'_3 = -\ 2.08006$ | $s_{34} = 0.003068$ | | |
| | | | | Vgl |
| IV $L_4$ | $R_4 = +\ 0.88344$ | $d_4 = 0.195929$ | $n_4 = 1.71700$ | |
| | $R'_4 = +\ 1.02017$ | $s_{45} = 0.337795\ (\gamma)$ | | EO |
| V $L_5$ | $R_5 = +\ 5.69393$ | $d_5 = 0.062498$ | $n_5 = 1.54814$ | |
| | $R'_5 = +\ 0.95622$ | $CS = s_{56} = 0.233887$ | | |
| VI $L_6$ | $R_6 = -\ 0.90273$ | $d_6 = 0.047161$ | $n_6 = 1.84666$ | |
| | $R'_6 = +\ 2.14068$ | $s_{67} = 0$ | | |
| VII $L_7$ | $R_7 = +\ 2.14068$ | $d_7 = 0.253442$ | $n_7 = 1.78831$ | |
| | $R'_7 = -\ 1.11219$ | $s_{78} = 0.002301\ (\delta_1)$ | | Hgl |
| VIII $L_8$ | $R_8 = +\ 10.4996$ | $d_8 = 0.137648$ | $n_8 = 1.71300$ | |
| | $R'_8 = -\ 1.78824$ | $s_{89} = 0.002300\ (\delta_2)$ | | |
| IX $L_9$ | $R_9 = +\ 3.34428$ | $d_9 = 0.134965$ | $n_9 = 1.73350$ | |
| | $R'_9 = -\ 3.80673$ | | | |

Aspherical surfaces: $R_5$ with $c_1 = (2 \cdot R_5)^{-1}$, $c_2 = -2.1655465 \cdot 10^{-5}$, $c_3 = c_4 = c_5 = 0$.

$F = 1.00000\ f/1.24\ 2\omega_o = 60°\ s'_\infty = +1.02698\ F$

| Lens | | Radii | Thicknesses and spacings | $n_d/v_d$ | |
|---|---|---|---|---|---|
| I | $L_1$ | $R_1 = +2.28038$ | $d_1 = 0.075649$ | 1.68273/44.51 | |
| | | $R'_1 = +1.03603$ | $s_{12} = 0.309443$ | | |
| II | $L_2$ | $R_2 = +5.64519$ | $d_2 = 0.101032$ | 1.65844/50.88 | |
| | | $R'_2 = +1.33972$ | $s_{23} = 0.445243\ (\alpha)$ | | NS |
| III | $L_{3a}$ | $R_{3a} = +1.75286$ | $d_{3a} = 0.272561$ | 1.71300/53.85 | |
| | | $R'_{3a} = -5.54731$ | $s_{3a,b} = 0.070650$ | | Vgl |
| | $L_{3b}$ | $R_{3b} = +15.1975$ | $d_{3b} = 0.170567$ | 1.71300/53.85 | |
| | | $R'_{3b} = -2.90250$ | | | |
| | | | $s_{34} = 0.002231\ (\beta)$ | | |
| IV | $L_4$ | $R_4 = +0.81191$ | $d_4 = 0.131338$ | 1.71300/53.85 | |
| | | $R'_4 = +0.99154$ | $s_{45} = 0.317020\ (\gamma)$ | | EO |
| V | $L_5$ | $R_5 = +8.48566$ | $d_5 = 0.061919$ | 1.50847/61.19 | |
| | | $R'_5 = +0.90007$ | $CS = s_{56} = 0.249562$ | | |
| VI | $L_6$ | $R_6 = -0.97119$ | $d_6 = 0.041959$ | 1.84666/23.82 | |
| | | $R'_6 = +1.68540$ | $s_{67} = 0$ | | |
| VII | $L_7$ | $R_7 = +1.68540$ | $d_7 = 0.264753$ | 1.78831/47.37 | |
| | | $R'_7 = -1.16566$ | $s_{78} = 0.002000\ (\delta_1)$ | | Hgl |
| VIII | $L_8$ | $R_8 = -52.9668$ | $d_8 = 0.138453$ | 1.71300/53.85 | |
| | | $R'_8 = -1.47025$ | $s_{89} = 0.002654\ (\delta_2)$ | | |
| IX | $L_9$ | $R_9 = +2.09194$ | $d_9 = 0.131108$ | 1.73350/51.65 | |
| | | $R'_9 = +109.081$ | | | |

Aspherical surfaces: $R_5$ with $c_1 = (2 \cdot R_5)^{-1}$, $c_2 = -3.7736161 \cdot 10^{-1}$, $c_3 = c_4 = c_5 = 0$.

8. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

$F = 1.00000\ f/1.24\ 2\omega_o = 60°\ s'_\infty = +1.04162\ F$

| Lens | | Radii | Thicknesses and spacings | $n_d/v_d$ | |
|---|---|---|---|---|---|
| I | $L_1$ | $R_1 = +2.37259$ | $d_1 = 0.082227$ | 1.68273/44.51 | |
| | | $R'_1 = +1.05220$ | $s_{12} = 0.323144$ | | |
| II | $L_2$ | $R_2 = +5.42735$ | $d_2 = 0.115655$ | 1.65016/39.14 | |
| | | $R'_2 = +1.49703$ | $s_{23} = 0.478375\ (\alpha)$ | | NS |
| III | $L_{3a}$ | $R_{3a} = +1.96776$ | $d_{3a} = 0.266661$ | 1.74400/44.77 | |
| | | $R'_{3a} = -9.79152$ | $s_{3a,b} = 0.096059$ | | Vgl |
| | $L_{3b}$ | $R_{3b} = +7.89031$ | $d_{3b} = 0.190582$ | 1.71300/53.85 | |
| | | $R'_{3b} = -2.90218$ | | | |
| | | | $s_{34} = 0.003074\ (\beta)$ | | |

-continued

| Lens | Radii | Thicknesses and spacings | $n_d/\nu_d$ | | | |
|------|-------|--------------------------|-------------|---|---|---|
| IV $L_4$ | $R_4 = +0.86642$ | $d_4 = 0.161764$ | 1.71700/47.99 | | | |
|      | $R_4' = +1.00774$ | $s_{45} = 0.330828\ (\gamma)$ | | EO | | |
| V $L_5$ | $R_5 = +5.70604$ | $d_5 = 0.059557$ | 1.54814/45.75 | | | |
|      | $R_5' = +0.90465$ | $CS = s_{56} = 0.249370$ | | | | |
| VI $L_6$ | $R_6 = -0.82980$ | $d_6 = 0.041498$ | 1.84666/23.82 | | | |
|      | $R_6' = +2.54792$ | $s_{67} = 0$ | | | | |
| VII $L_7$ | $R_7 = +2.54792$ | $d_7 = 0.255134$ | 1.78831/47.37 | | | |
|      | $R_7' = -1.03717$ | $s_{78} = 0.003842\ (\delta_1)$ | | Hgl | | |
| VIII $L_8$ | $R_8 = +9.51371$ | $d_8 = 0.139478$ | 1.71300/53.85 | | | |
|      | $R_8' = -1.77821$ | $s_{89} = 0.003074\ (\delta_2)$ | | | | |
| IX $L_9$ | $R_9 = +3.05211$ | $d_9 = 0.139862$ | 1.73350/51.65 | | | |
|      | $R_9' = -4.40528$ | | | | | |

$F = 1.00000\ f/1.24\ 2\omega_0 = 60°\ s'_\infty = +1.04162\ F$

Aspherical surfaces: $R_5$ with $c_1 = (2 \cdot R_5)^{-1}$, $c_2 = -3.4253170 \cdot 10^{-1}$, $c_3 = c_4 = c_5 = 0$.

9. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

| Lens | Radii | Thicknesses and spacings | $n_d/\nu_d$ | | | |
|------|-------|--------------------------|-------------|---|---|---|
| I $L_1$ | $R_1 = +2.25420$ | $d_1 = 0.075309$ | 1.68273/44.51 | | | |
|      | $R_1' = +1.01132$ | $s_{12} = 0.314043$ | | | | |
| II $L_2$ | $R_2 = +4.58177$ | $d_2 = 0.122848$ | 1.65844/50.88 | | | |
|      | $R_2' = +1.38713$ | $s_{23} = 0.491084\ (\alpha)$ | | NS | | |
| III $L_{3a}$ | $R_{3a} = +1.79457$ | $d_{3a} = 0.257427$ | 1.71300/53.85 | | | |
|      | $R_{3a}' = -6.95357$ | $s_{3a,b} = 0.087963$ | | | Vgl | |
| $L_{3b}$ | $R_{3b} = +12.9780$ | $d_{3b} = 0.173580$ | 1.71300/53.85 | | | |
|      | $R_{3b}' = -2.78172$ | | | | | |
|      | | $s_{34} = 0.002769\ (\beta)$ | | | | |
| IV $L_4$ | $R_4 = +0.81634$ | $d_4 = 0.139656$ | 1.71300/53.85 | | | |
|      | $R_4' = +0.94692$ | $s_{45} = 0.317428\ (\gamma)$ | | EO | | |
| V $L_5$ | $R_5 = +5.71174$ | $d_5 = 0.059347$ | 1.50847/61.19 | | | |
|      | $R_5' = +0.90726$ | $CS = s_{56} = 0.264389$ | | | | |
| VI $L_6$ | $R_6 = -0.89844$ | $d_6 = 0.042808$ | 1.84666/23.82 | | | |
|      | $R_6' = +1.92688$ | $s_{67} = 0$ | | | | |

$F = 1.00000\ f/1.24\ 2\omega_0 = 60°\ s'_\infty = +1.02697\ F$

-continued $F = 1.00000$ f/1.24 $2\omega_0 = 60°$ $s'_\infty = + 1.02697$ F

| Lens | | Radii | Thicknesses and spacings | $n_d/\nu_d$ | |
|---|---|---|---|---|---|
| VII | $L_7$ | $R_7 = + 1.92688$ | $d_7 = 0.265119$ | 1.78831/47.37 | |
| | | $R'_7 = - 1.08960$ | | | |
| | | | $s_{78} = 0.003269$ $(\delta_1)$ | | Hgl |
| VIII | $L_8$ | $R_8 = + 20.6329$ | $d_8 = 0.150656$ | 1.71300/53.85 | |
| | | $R'_8 = - 1.51790$ | | | |
| | | | $s_{89} = 0.005000$ $(\delta_2)$ | | |
| IX | $L_9$ | $R_9 = + 2.13877$ | $d_9 = 0.136848$ | 1.73350/51.65 | |
| | | $R'_9 = - 20.7200$ | | | |

Aspherical surfaces: $R_5$ with $c_1 = (2 \cdot R_5)^{-1}$, $c_2 = -3.8265852 \cdot 10^{-1}$, $c_3 = -5.9537649 \cdot 10^{-2}$, $c_4 = c_5 = 0$.

10. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

$F = 1.00000$ f/1.23 $2\omega_0 = 60°$ $s'_\infty = + 1.02697$ F

| Lens | | Radii | Thicknesses and spacings | $n_d/\nu_d$ | |
|---|---|---|---|---|---|
| I | $L_1$ | $R_1 = + 2.52595$ | $d_1 = 0.128446$ | 1.68273/44.51 | |
| | | $R'_1 = + 1.09628$ | | | |
| | | | $s_{12} = 0.315556$ | | |
| II | $L_2$ | $R_2 = + 6.34487$ | $d_2 = 0.119628$ | 1.65016/39.14 | |
| | | $R'_2 = + 1.41026$ | | | |
| | | | $s_{23} = 0.488096$ $(\alpha)$ | | NS |
| III | $L_{3a}$ | $R_{3a} = + 2.00645$ | $d_{3a} = 0.230053$ | 1.74400/44.77 | |
| | | $R'_{3a} = - 10.0560$ | | | |
| | | | $s_{3a,b} = 0.084353$ | | Vgl |
| | $L_{3b}$ | $R_{3b} = + 9.35780$ | $d_{3b} = 0.173307$ | 1.71300/53.85 | |
| | | $R'_{3b} = - 2.81386$ | | | |
| | | | $s_{34} = 0.003068$ $(\beta)$ | | |
| IV | $L_4$ | $R_4 = + 0.88344$ | $d_4 = 0.195929$ | 1.71700/47.99 | |
| | | $R'_4 = + 1.02017$ | | | |
| | | | $s_{45} = 0.337795$ $(\gamma)$ | | EO |
| V | $L_5$ | $R_5 = + 5.69393$ | $d_5 = 0.062498$ | 1.54814/45.75 | |
| | | $R'_5 = + 0.95622$ | | | |
| | | | CS $= s_{56} = 0.233887$ | | |
| VI | $L_6$ | $R_6 = - 0.90273$ | $d_6 = 0.047161$ | 1.84666/23.82 | |
| | | $R'_6 = + 1.84666$ | | | |
| | | | $s_{67} = 0$ | | O |
| VII | $L_7$ | $R_7 = + 2.14068$ | $d_7 = 0.253442$ | 1.78831/47.37 | |
| | | $R'_7 = - 1.11219$ | | | |
| | | | $s_{78} = 0.002301$ $(\delta_1)$ | | Hgl |
| VIII | $L_8$ | $R_8 = + 10.4996$ | $d_8 = 0.137648$ | 1.71300/53.85 | |
| | | $R'_8 = - 1.78824$ | | | |
| | | | $s_{89} = 0.002300$ $(\delta_2)$ | | |
| IX | $L_9$ | $R_9 = + 3.34428$ | $d_9 = 0.134965$ | 1.73350/51.65 | |
| | | $R'_9 = - 3.80673$ | | | |

Aspherical surfaces: $R_5$ with $c_1 = (2 \cdot R_5)^{-1}$, $c_2 = -3.8418157 \cdot 10^{-1}$, $c_3 = c_4 = c_5 = 0$.

* * * * *